United States Patent [19]

Hulbert et al.

[11] Patent Number: 5,675,616
[45] Date of Patent: Oct. 7, 1997

[54] APPARATUS FOR USE IN EQUIPMENT PROVIDING A DIGITAL RADIO LINK BETWEEN A FIXED AND A MOBILE RADIO UNIT

[75] Inventors: Anthony Peter Hulbert, Shirely, England; Alfred Michael Krumpe, Seefeld, Germany

[73] Assignee: Roke Manor Research Limited, Hampshire, England

[21] Appl. No.: 535,355

[22] Filed: Sep. 28, 1995

[30] Foreign Application Priority Data

Sep. 28, 1994 [GB] United Kingdom ............ 9419496

[51] Int. Cl.$^6$ ......................................... H04L 7/00
[52] U.S. Cl. .................................. 375/355; 375/347
[58] Field of Search ............................ 375/200, 201, 375/202, 203, 204, 206, 346, 348, 316, 371, 347, 343, 340; 370/105.3; 575/355; 327/91, 94, 141, 155, 156, 159

[56] References Cited

U.S. PATENT DOCUMENTS

| | | | |
|---|---|---|---|
| 4,965,808 | 10/1990 | Maine | 375/200 |
| 5,077,754 | 12/1991 | Namioka | 375/200 |
| 5,361,276 | 11/1994 | Subramanian | 375/200 |
| 5,590,160 | 12/1996 | Ostman | 375/367 |
| 5,594,755 | 1/1997 | Hulbert | 375/208 |

FOREIGN PATENT DOCUMENTS

| | | |
|---|---|---|
| 94 13268.5 | 6/1993 | United Kingdom . |
| 94 15191.7 | 8/1993 | United Kingdom . |
| 2 278 983 | 12/1994 | United Kingdom . |

*Primary Examiner*—Tesfaldet Bocure
*Assistant Examiner*—Bryan Webster
*Attorney, Agent, or Firm*—Hill, Steadman & Simpson

[57] ABSTRACT

For a Rake receiver in which the received signal is sampled at only one sample per chip, the signal is energy collected from several multipath components by the Rake fingers. If any multipath component is not perfectly aligned with the sampling time, several Rake fingers will be needed to collect its energy. If the number of Rake fingers available is limited, then more efficient collection of energy is possible if fine timing correction is applied to the sampling so that optimum sampling is applied to the strongest multipath component. In this way, only one Rake finger is required and the other Rake fingers may be dedicated to the remaining multipath components. The present invention uses two types of control methods, a Tau dither phase control circuit or a pilot jitter clock circuit. The control circuit generates control signals for the various Rake fingers and also controls a clock phase adjuster which in turn controls a sample and hold circuit which receives the analog complex baseband input signal which is fed via an analog-to-digital converter into a complex shift register, each stage of which is connected to each Rake finger and is selectable by each Rake finger.

7 Claims, 2 Drawing Sheets

APPARATUS FOR USE IN EQUIPMENT PROVIDING A DIGITAL RADIO LINK BETWEEN A FIXED AND A MOBILE RADIO UNIT

RELATED APPLICATION

The present application is related to the application Ser. No. 497,544 of Hulbert et al entitled "APPARATUS FOR USE IN EQUIPMENT PROVIDING A DIGITAL RADIO LINK BETWEEN A FIXED AND A MOBILE RADIO UNIT", filed Jun. 30, 1995.

BACKGROUND OF THE INVENTION

The present invention relates to apparatus for use in equipment providing a digital radio link using a direct sequence spread spectrum between a fixed and a mobile radio unit.

In co-pending British patent application number 9316489.5, there is described a comprehensive Rake Receiver in which a contiguous set of Rake fingers is not required. The savings in cost and complexity are maximized if the fewest number of Rake fingers are used. The sampling of a received signal is performed at only one sample per chip and multiple Rake fingers are used.

The Rake fingers referred to above may be assigned to a single multipath component in order to acquire most of its energy when the component is sampled at a non-optimum time. When the number of available Rake fingers is limited (e.g. n), these are assigned to the n strongest responses to the multipath components. If the strongest multipath component is non-optimally sampled, then several Rake fingers will need to be assigned to its responses in order to recover most of its power. In this case, fewer Rake fingers remain available for assignment to the other multipath responses. If the timing of sampling can be held such that the strongest multipath component is always sampled optimally, then only one Rake finger will be needed for its reception. This makes available more of the other Rake fingers for combining the signal from the other multipath components, permitting improved overall performance. Conversely, for the same performance, a smaller number of Rake fingers could be used.

In the context of CDMA cellular mobile radio systems, the present invention is only of benefit on the downlink (base station to mobile unit direction). The reason for this is that the base station receiver must handle signals received from many mobile units, all coming over different propagation paths so that the delays associated with the strongest path for every signal will be different. Since all signals pass through a single an analog-to-digital converter, it is not possible to control the timing of the sampling for the different received signals independently.

For the mobile unit receiver, however, the signal is received from only one base station, so that alignment is possible. The saving from this is most beneficial, because there are far more mobile unit receivers than base station receivers and because power consumption is critical.

SUMMARY OF THE INVENTION

Accordingly, an object of the present invention is to provide an apparatus in which a timing loop is closed around a single Rake finger which is experiencing the strongest signal, and which is sampled at only one sample per chip thereby rendering arbitrary the timing of other Rake fingers with respect to their multipath components.

According to the present invention, there is provided an apparatus for use in equipment providing a digital radio link between a fixed and a mobile radio unit, said apparatus comprising a radio receiver having a plurality of Rake fingers, each Rake finger having means for selectively receiving the contents of each bit of a shift register, said shift register being arranged to receive an analog complex baseband signal via a sample and hold circuit and a analog-to-digital converter, wherein said sample and hold circuit receives a control signal from a clock phase adjuster circuit which is controlled by control means in dependence upon an output signal received from each Rake finger.

The above and other objects, features and advantages of the present invention will become more apparent from the following detailed description taken with the accompanying drawings.

DESCRIPTION OF THE PREFERRED EMBODIMENTS

Figure 1:
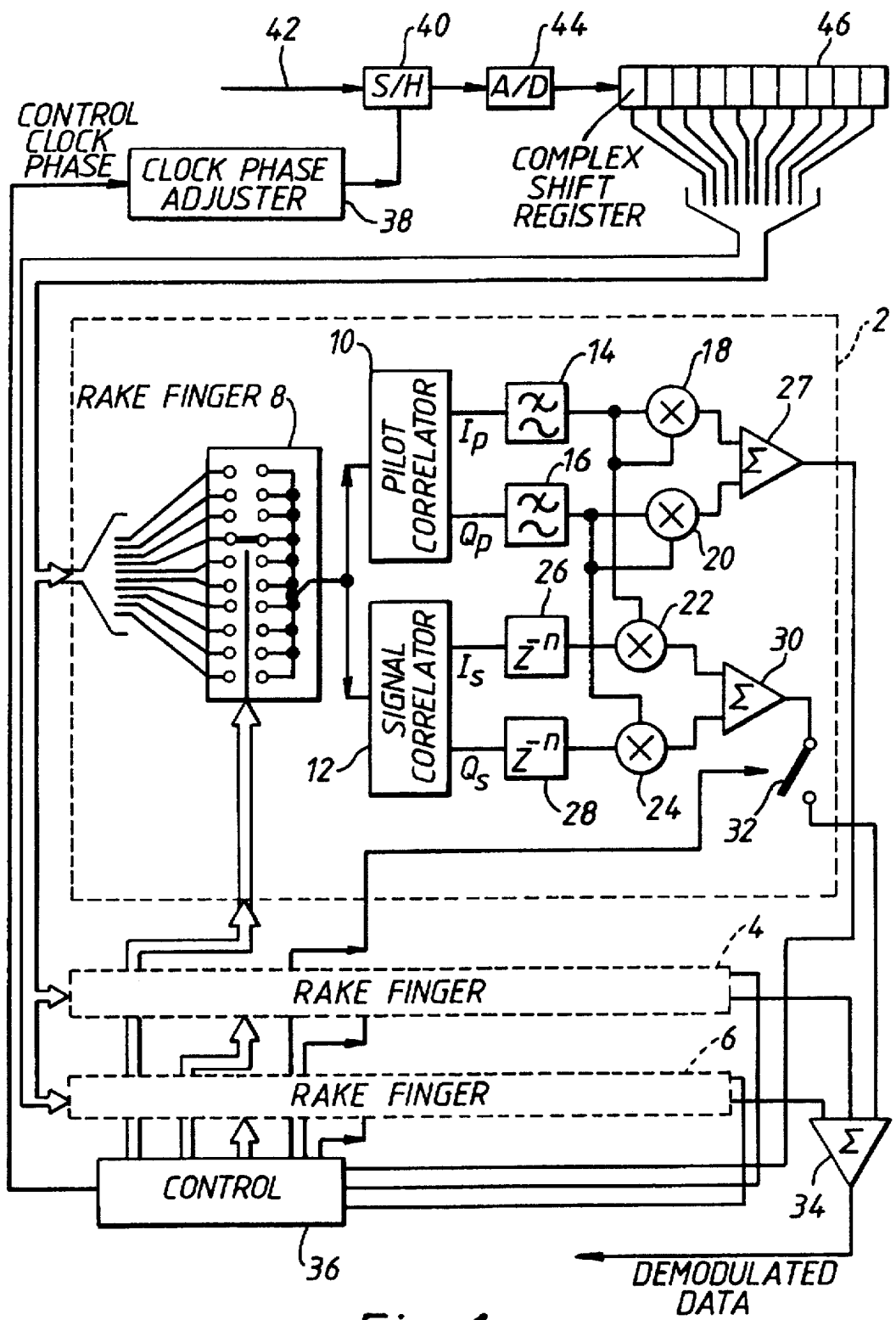
FIG. 1 shows a block diagram of a single finger aligned Rake receiver.

Referring to FIG. 1, there is shown a basic single finger aligned Rake finger comprising three Rake fingers 2, 4, 6. It will be appreciated that each Rake finger is identical, and the description hereafter refers to the Rake finger 2 only. Each Rake finger comprises a selectible switch 8, the output of which is connected to an input of a pilot correlator 10 and to an input of a signal correlator 12. Each correlator generates an in-phase output signal and a quadrature phase output signal. Each output from the pilot correlator 10 is connected to a filter 14, 16 respectively, the outputs of which are connected to first and second inputs of a multiplying circuit 18, 20, respectively, and to an input of multiplying circuits 22, 24, respectively. The outputs of the signal correlator 12 are each connected to an input of a delay circuit 26, 28, the output of which is connected to a further input of a respective multiplying circuit 22, 24. The outputs from the multiplying circuits 18, 20 are connected to an adder 27, and the outputs of the multipliers 22, 24 are connected to an adder 30. The output summator 30 is connected via a controlled switch 32 to a further adder 34. The output of the adder circuit 27 is connected to an input of the control circuit 36. The output from the adder 30 and of the adders in the other Rake fingers are similarly connected to an input of the adder 34, the output of which generates the demodulated data. The outputs from the adders 27 in the other Rake fingers are also connected to the input of the control circuit 36. The output of the control circuit 36 is connected to an input of a clock phase adjuster circuit 38, the output of which controls a sample and hold circuit 40 which receives at an input thereof an analog baseband signal on input lead 42. The output of the sample and hold circuit is connected to a digital to analog converter 44, the output of which is connected to a first stage of a complex shift register 46. Each stage of the complex shift register 46 is connected to a respective input of the selectable switch 8 in each Rake finger.

The control circuit 36 provides a signal to control the clock phase of the sample and hold circuit 40 via the clock phase adjuster circuit 38 to obtain optimum sampling. The control can be performed in either a digital or an analog fashion. The functionality of the control circuit 36 either implements a Tau dither loop (as familiar to those versed in the art) or a jittered pilot receiver as described in British patent application number 9415191.7. The remainder of the circuit operation is as described in British patent application number 9413268.5.

Figure 2:
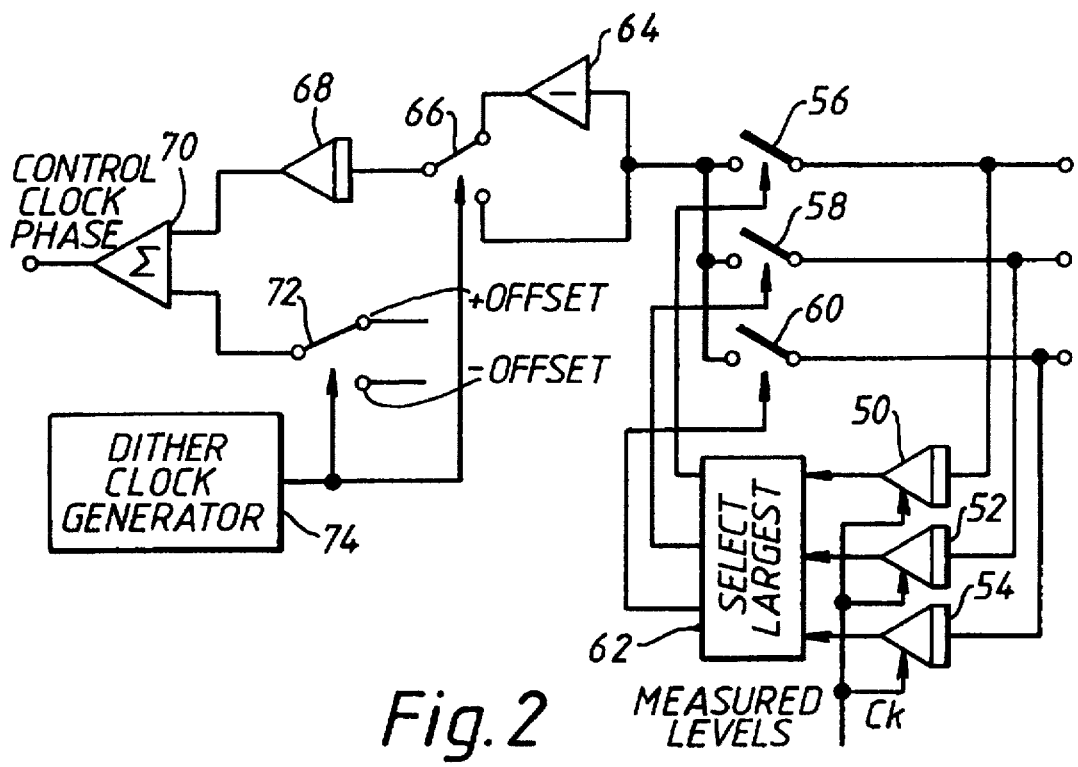
FIG. 2 shows a block diagram of the controller shown in FIG. 1.

Referring to FIG. 2, the control function implemented by a Tau dither loop will now be described.

The control circuit comprises several integrators 50, 52, 54 which receive the output signals from the adders 27 in each Rake finger of FIG. 1. These signals are also connected to a plurality of control switches 56, 58, 60. These switches are controlled by a largest select circuit 62 which receives the outputs from the integrator circuits 50, 52, and 54. The output of each switch 56, 58, 60 is connected to an input of an inverter 64 and to an input of a switching circuit 66, the function of which is to short circuit the inverter 64. The output of the subtractor circuit 64 is connected to a further input of the switch 66, the output of which is connected to an integrator filter 68. The output of the integrator filter 68 is connected to the input of a an adder 70. The switch 66 and the further switch 72 are controlled by a dither clock generator 74. The switch 72 is arranged to switch a positive or negative offset to a further input of the adder 70, the output of which is used to control a clock phase and is applied to the clock phase adjuster 38 in FIG. 1.

The integrators 50, 52, 54 average the signal power over a measured interval (several milliseconds), and the largest is selected and routed by the switches 56, 58, 60 to an inverter 64 and switch 66 which alternatively adds and subtracts the current measurement into the integrator 68. Synchronously with this operation, a Dither signal is generated and added to the output of the control signal. Operation is thus that the Dither signal causes the pilot power for the strongest Rake to be measured when the sample phase is early and when it is late. Alternate addition and subtraction of these into the integrator 68 is equivalent to feeding the difference of early and late measurements into the loop filter. When the timing is correct, the pilot signal in the early case will be the same as in the late case.

Figure 3:
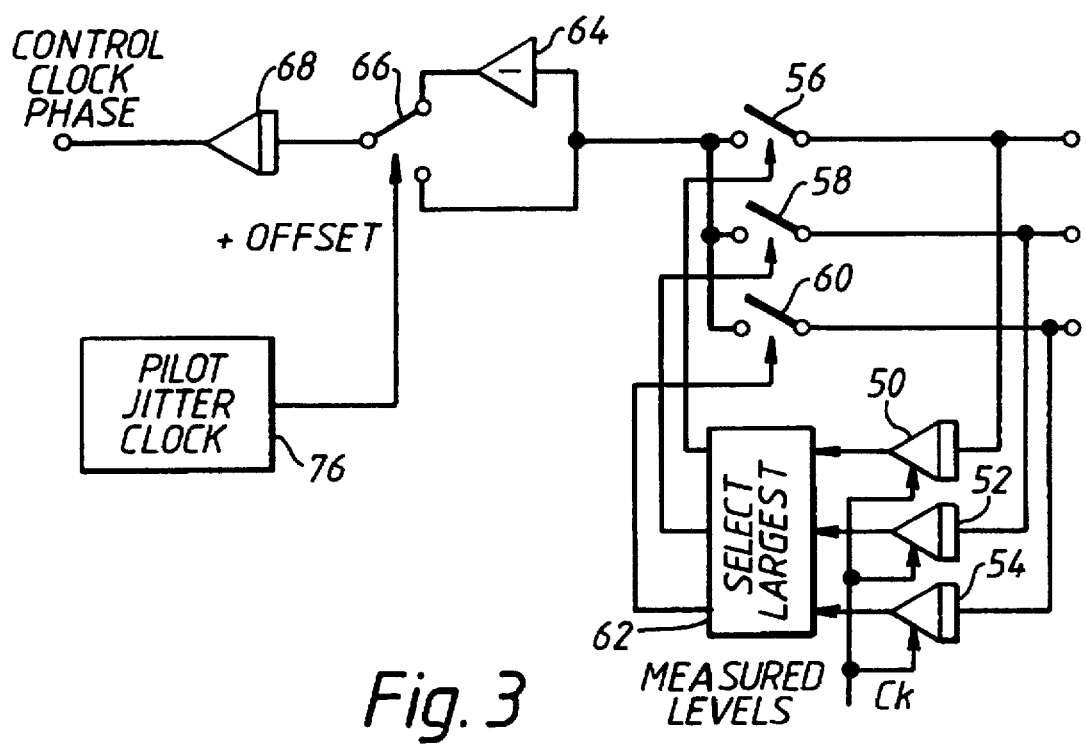
FIG. 3 shows a block diagram of an alternative controller as shown in FIG. 1.

Referring to FIG. 3, a pilot jitter solution is shown. In FIG. 3, like elements as in FIG. 2 have been given the same reference numeral and operate in the same manner. It will be noted that the difference is the provision of pilot jitter clock 76, which is used directly to control the switch 66. There is no need for an adder 70 as shown in FIG. 2 or the additional switch 72 for providing a positive and negative offset. As mentioned above, there is no need for a Dither circuit, since this is implemented on the pilot in the transmitter. The pilot jitter clock is synchronized to the local pilot code, dividing between the early and late phases of the pilot jitter.

Although various minor changes and modifications might be proposed by those skilled in the art, it will be understood that our wish is to include within the claims of the patent warranted hereon all such changes and modifications as reasonably come within our contribution to the art.

We claim as our invention:

1. A Rake receiver for use in equipment providing a digital radio link between a fixed and a mobile radio unit, comprising:

a sample and hold circuit for receiving an analog complex baseband signal;

an analog-to-digital converter connected to an output of the sample and hold circuit;

an output of the analog-to-digital converter connecting to a shift register;

outputs of the shift register connecting to a plurality of Rake fingers, each Rake finger having means for selectively receiving contents of each bit of said shift register; and a control means for receiving outputs from said Rake fingers and for providing an output to a clock phase adjuster circuit for creating a control signal connected to said sample and hold circuit.

2. A Rake receiver according to claim 1 wherein each Rake finger includes a pilot correlator from which said respective output signal to said control means is generated.

3. A Rake receiver according to claim 1 wherein said control means comprises a Tau dither phase control circuit.

4. A Rake receiver according to claim 3 wherein said Tau dither control circuit comprises integration means for averaging signal power over an interval of time on each input line to the control means, means for selecting a larger signal, means for alternately adding and subtracting said selected signal into a further integrator, and means for adding a Dither signal to an output signal of said further integrator.

5. A Rake receiver according to claim 1 wherein said control means comprises a pilot jitter phase control circuit.

6. An apparatus according to claim 5 wherein said Dither phase control circuit includes integration means for averaging signal power over an interval of time on each input line to the control means, means for selecting a larger signal, and means for alternately adding and subtracting said selected signal into a further integrator under control of a pilot jitter clock signal.

7. A Rake receiver for use in equipment providing a digital radio link between a fixed and a mobile radio unit, comprising:

a sample and hold circuit for receiving an analog complex baseband signal;

an analog-to-digital converter connected to an output of the sample and hold circuit;

an output of the analog-to-digital converter connecting to a shift register;

outputs of the shift register connecting to a plurality of Rake fingers, each Rake finger having a selectable switch selectively receiving contents of each bit of said shift register;

a control unit for receiving outputs from said Rake fingers and for providing an output to a clock phase adjuster circuit for creating a control signal connected to said sample and hold circuit; and outputs of the Rake fingers being connected to an adder for providing demodulated data at an output thereof.

* * * * *